United States Patent [19]

Boyd

[11] 4,249,214

[45] Feb. 3, 1981

[54] EXCITER HAVING INCIDENTAL PHASE CORRECTION COMPENSATION IN CONSONANCE WITH OUTPUT POWER LEVEL

[75] Inventor: William M. Boyd, Washington, Pa.

[73] Assignee: RCA Corporation, New York, N.Y.

[21] Appl. No.: 23,392

[22] Filed: Mar. 23, 1979

[51] Int. Cl.³ .......................... H04N 5/40; H04B 1/04
[52] U.S. Cl. ........................................ 358/186; 455/92; 455/116; 455/119
[58] Field of Search ........................ 358/186, 187, 86; 325/62, 63, 136, 153, 182, 183; 455/108, 109, 119, 92, 116

[56] References Cited

PUBLICATIONS

Irmer et al., "20 KW UHF Television Transmitter With All Solid State Driver For Klystron Amplifiers," *Electrical Communication*, vol. 48, No. 4, 1973, pp. 436-443.

*Primary Examiner*—John C. Martin
*Attorney, Agent, or Firm*—Eugene M. Whitacre; Paul J. Rasmussen; William H. Meise

[57] ABSTRACT

Television broadcast transmitters are often operated at remote sites and must be remotely controlled. The transmitters often include exciters driving high-power amplifiers. The exciters and high-power amplifiers produce incidental phase modulation of the broadcast signals. An exciter for generating modulated carrier signals at a television video carrier frequency may include compensation for incidental phase modulation in the exciter itself and in the following amplifiers. Such an exciter includes a first modulator for modulating video onto an IF carrier, which is coupled through a power splitter to a second modulator. The second modulator is switched at a frequency equal to the sum of the video and intermediate frequencies to produce the desired modulated carrier. The output of the power divider is coupled to an envelope detector which reconstitutes the video. The reconstituted video is applied to the control input of a phase modulator coupled to the second mixer for producing a phase compensation of the modulated carrier in response to the video amplitude. Remote control of the power output of the exciter is provided by a motorized attenuator. A corresponding adjustment of the incidental phase correction is achieved by connecting the motorized attenuator between the first modulator and the power divider. In order to provide increased phase control range, improved video-frequency rejection and reduced incidental amplitude modulation, the phase modulator is coupled between the carrier-frequency generator and the second modulator. The phase modulator may also be coupled between the power splitter and the second modulator.

6 Claims, 3 Drawing Figures

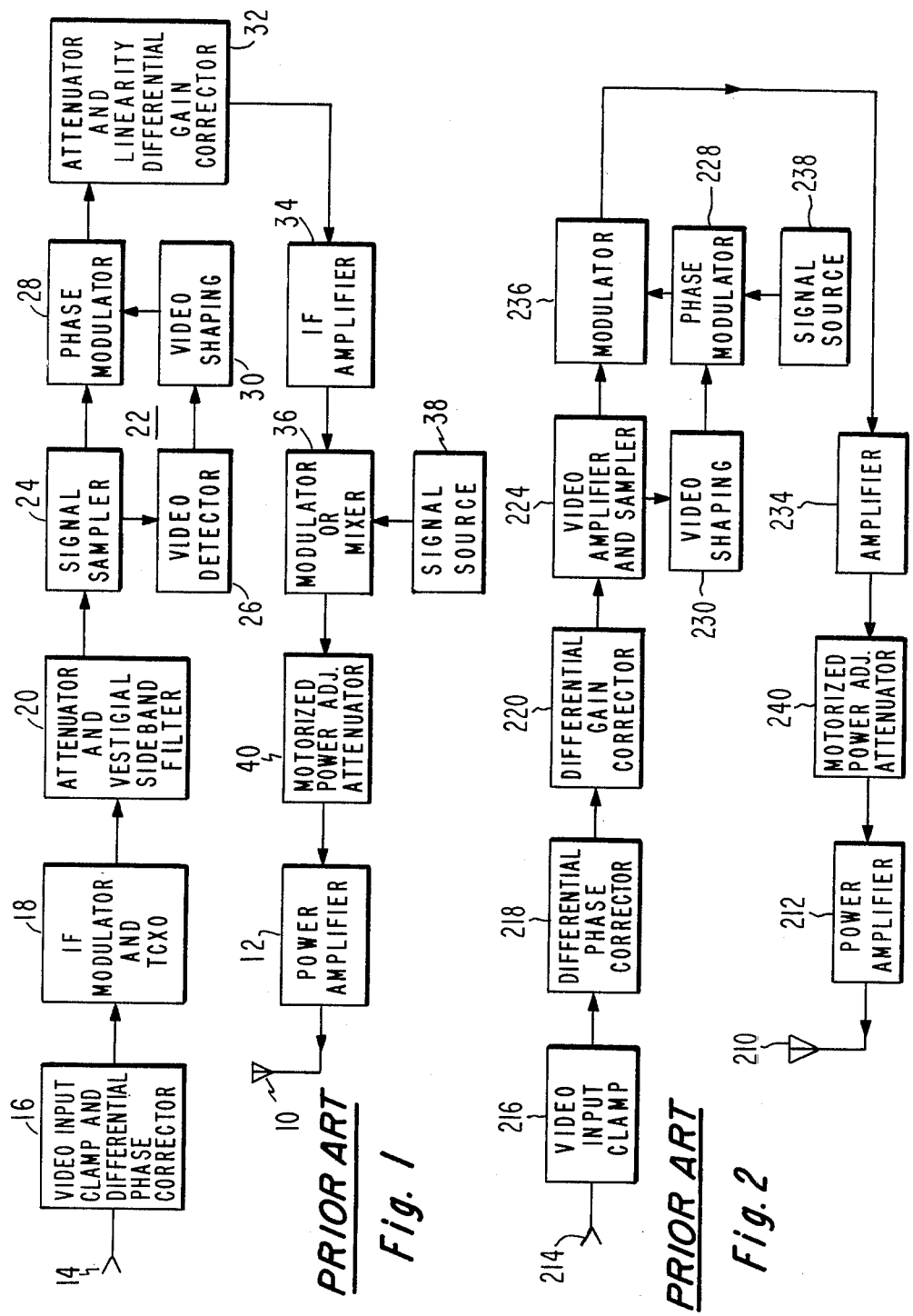

EXCITER HAVING INCIDENTAL PHASE CORRECTION COMPENSATION IN CONSONANCE WITH OUTPUT POWER LEVEL

BACKGROUND OF THE INVENTION

This invention relates to broadcast and high-power electromagnetic-signal amplifiers including incidental phase correction responsive to the amplitude modulation.

Television broadcast transmitters amplitude-modulate video information signals onto carriers at predetermined standard frequencies. Such transmitters and their associated antennas are normally located where the best possible broadcast coverage can be obtained. Frequently, the transmitter site is remote from the studio where the video signals are generated. Consequently, remote control of the most important transmitter parameters is required. Ideally, a remote control, such as that of transmitter output power, should not cause a degradation of the transmitted signal in other respects.

Broadcast transmitters often include an exciter which modulates video onto a carrier at the desired output frequency, but at a power level less than that desired. High-power radio-frequency amplifiers are used to amplify the output of the exciter and apply it to the antennas. The voltage and current excursions in the high power amplifiers are large, and consequently distortions of the transmitter output occur. It is customary to predistort the exciter output to compensate for the expected distortion in the high power amplifier stages. Thus, it is known to use resistor-diode networks to correct the exciter signal to compensate for differential gain, i.e., gain changes at particular video frequencies which are dependent upon the amplitude of low-frequency video signal components. It is also known to use resistor-diode networks to compensate for differential phase distortion, i.e., phase changes in high-frequency video signals resulting from low-frequency amplitude excursions. One form of distortion which is particularly severe in high-power radio frequency amplifiers is incidental phase distortion, in which the phase of the carrier passing through the high power stage is shifted in an amount depending upon the signal amplitude. This is in effect a variable delay dependent upon signal amplitude, and is believed to result from changes in the effective capacitance and/or the input impedance of the amplifiers with signal level.

It is known to use a controllable phase modulator coupled between the carrier signal generator and the output modulator of the exciter and to apply video from the video source to the control input of the phase modulator in order to predistort the exciter output to compensate for the expected incidental phase modulation in the high-power amplifiers. In this arrangement, no possibility for simultaneous adjustment of transmitter output power and incidental phase correction exists.

It is also known to modulate the video onto an intermediate-frequency (IF) carrier, which in turn is used to drive a second modulator or mixer which converts the signal to a high frequency for driving the transmitter power amplifier device. In this arrangement, both the differential gain correction and the phase modulator for incidental phase correction operate on the modulated IF carrier. The video signal required for driving the phase control terminal of the phase modulator to achieve incidental phase correction is reconstituted from the modulated IF carrier by a video detector to which a sample of the modulated IF carrier is applied. In this arrangement, the limited bandwidth of the phase modulator may undesirably attenuate the band edges of the modulated IF carrier. Also, unwanted amplitude modulation of the modulated IF carrier may occur in response to the reconstituted video control signal because of unavoidable amplitude responses of the phase modulator.

It is desirable to operate the exciter in a manner which allows remote control of the transmitter output power without degradation of the incidental phase correction. It is also desirable to operate an exciter in a manner which reduces the effect of bandwidth limitations of the phase modulator on the output signal. Similarly, it is advantageous to have a phase modulator which is smaller and which provides more control range than heretofore.

SUMMARY OF THE INVENTION

An improved arrangement for generating incidental-phase-modulation corrected modulated carrier signals at a predetermined frequency includes a source of video signals and a mixer coupled to the source of video for modulating the video onto an IF carrier to form a modulated IF carrier. A signal sampler includes an input terminal and first and second output terminals. The input terminal of the sampler is coupled to the first modulator and the sampler produces samples of the modulated IF carrier at its output terminals. An AM or envelope detector is coupled to the first output terminal of the signal sampler for producing a reconstituted video signal. A second mixer includes two input terminals and an output terminal. A source generates second carrier signals for application to the second or output mixer. The second carrier signals are at a frequency related to the intermediate frequency and to the desired video carrier frequency. Means are provided for coupling the first and second input terminals of the second modulator to the source of second carrier signals and to the second output terminal of the signal sampler. The modulated IF carrier signal is frequency translated by the second carrier to produce the desired modulated carrier at the video carrier frequency. A controllable phase modulator has a control input terminal coupled to the AM detector and has a controlled signal path by which incidental phase modulation is corrected. The controlled signal path of the phase modulator is coupled between the second modulator and either the source of second carrier signals or the second output of the signal sampler for improved performance.

DESCRIPTION OF THE DRAWING

FIGS. 1 and 2 illustrate in block diagram form broadcast transmitters according to the prior arts.

DESCRIPTION OF THE INVENTION

Figure 3:
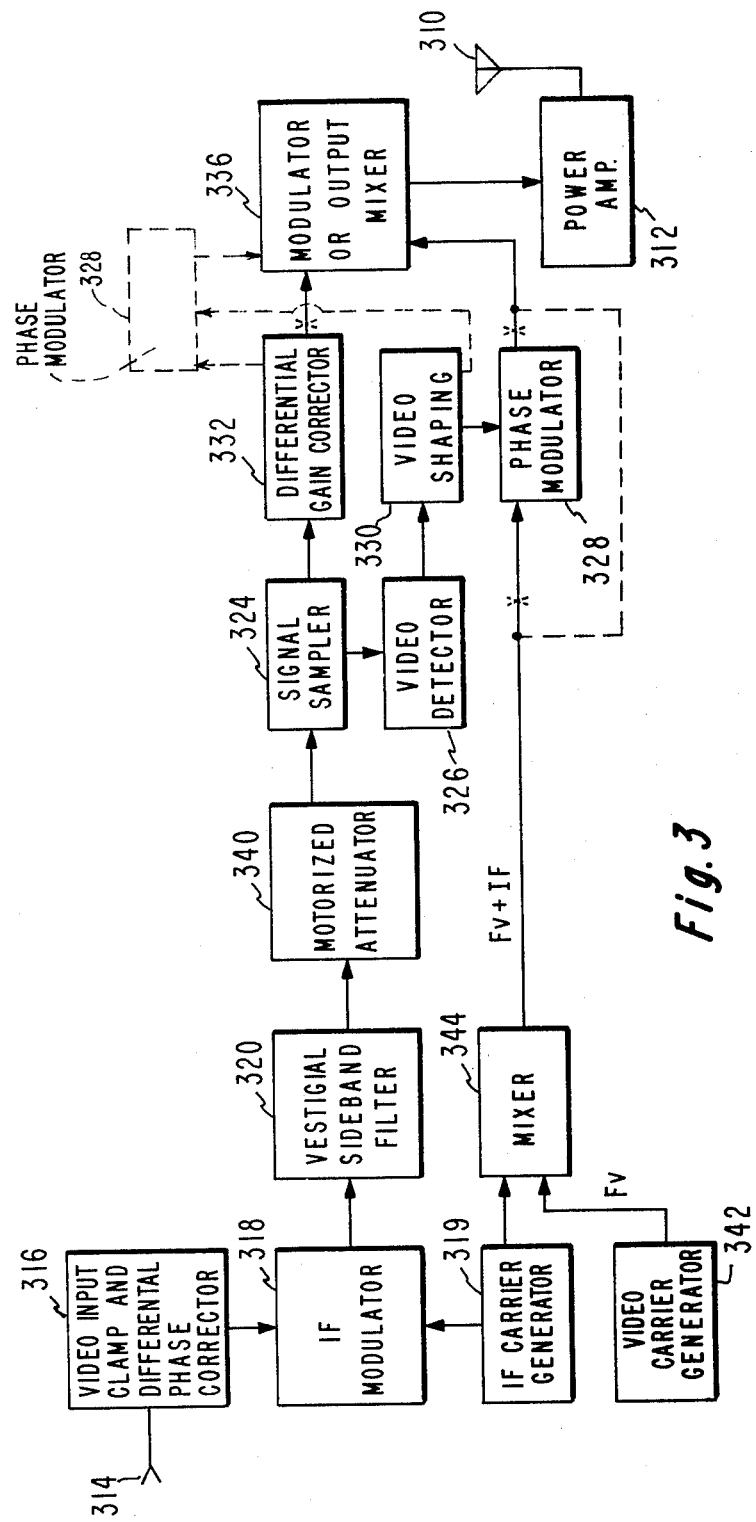
FIG. 3 illustrates in block diagram form a broadcast transmitter embodying the invention.

In FIG. 1, a broadcast transmitter according to the prior art includes an antenna 10 driven by a radio-frequency (RF) power amplifier 12. Amplifier 12 is driven with modulated RF carrier signals at the desired output frequency by an exciter represented by the remainder of FIG. 1. Video signals containing the information to be broadcast are applied to the exciter from an external source, not shown, coupled to exciter input terminal 14. The video input signal is coupled to a video input clamp and to a differential phase correction circuit illustrated together as a block 16. The input clamp reestablishes a direct-voltage reference which may have been lost by antecedent AC-coupled circuits. The differential phase corrector portion of block 16 may include known resistor-diode networks by which phase is corrected in response to the amplitude of the signal by variations in the diode capacitance.

The clamped and differential-phase corrected video is applied to a frequency translating device illustrated as a block 18. Block 18 includes a mixer or modulator driven at an intermediate frequency by a carrier generator which may include a temperature controlled crystal oscillator (TCXO). Frequency translator 18 produces an IF carrier amplitude-modulated with the video signal information. The modulated IF signal consists of upper and lower sidebands extending over a band of frequencies centered about the IF carrier frequency. The modulated IF is applied to a vestigial sideband filter illustrated as a block 20. The vestigial sideband filter may be associated with appropriate attenuators. Filter 20 eliminates a substantial portion of the lower-frequency sideband and passes the remainder to an incidental-phase predistortion or precorrection arrangement designated generally as 22. Incidental phase corrector 22 includes a signal sampler 24 which receives the modulated and filtered IF carrier from filter 20, extracts a sample and passes the remainder to the following stages. The sample of the filtered and modulated IF signal is applied to a video detector 26, which reconstitutes the video signal as modified by the elimination of a substantial portion of one sideband. The reconstituted video is applied to a control terminal of a phase modulator 28 by means of a video shaping circuit 30. The major portion of the filtered modulated IF applied to signal sampler 24 passes through the sampler and through phase modulator 28 and is phase-modulated by the reconstituted video applied to the control input of the phase modulator.

The incidental-phase corrected IF signal is coupled from the output of phase modulator 28 to an IF amplifier 34 by way of further attenuators and a differential gain corrector illustrated as a block 32. The differential gain corrector may consist of resistor-diode networks by which the gain is varied in response to the amplitude of the IF signal to provide a correction for the expected differential gain. The amplified modulated IF from IF amplifier 34 is applied to a modulator or mixer 36 which is also driven by a carrier signal generated by a signal source illustrated as a block 38. The frequency of the carrier produced by source 38 is preestablished to produce the desired video carrier frequency from the IF frequency. The modulated IF signal is up converted to the desired video carrier frequency in modulator 36. The output of modulator 36 is the desired modulated carrier at the television visual carrier frequency, but at too low a level to obtain suitable broadcasting range. The output of modulator 36 is passed through a motorized power adjust attenuator 40 to the input of power amplifier 12 for application to the antenna.

Attenuator 40 adjusts the amount of signal applied to the input of amplifier 12. The motor of attenuator 40 may be controlled from a remote location in order to maintain the transmitter output power at the desired level. For example, for operation of two transmitters in parallel, it may occasionally be desired to change the output power by 3 dB, or adjustment may be accomplished to maintain the output power at the legally permissible maximum. Further, the motor of attenuator 40 may be controlled by a feedback automatic level control for automatic adjustment of the output power.

In the arrangement of FIG. 1, adjustment of attenuator 40 changes the signal level applied to the input of the power amplifier 12, and thereby changes the amount of distortion of the amplifier. Consequently, the incidental phase compensation provided by corrector 22 may be excessive or inadequate. The adjustment of output power by means of remotely energized attenuator 40 may thus require a remote control of phase corrector 22 or acceptance of imperfect incidental phase correction. The exciter of FIG. 1 may produce unwanted amplitude modulation of the signal due to unavoidable amplitude-modulation response of phase modulator 28 to the video control signal. In addition, unavoidable limitations in the frequency bandwidth of phase modulator 28 may result in an attenuation of sidebands of the modulated IF carrier passing therethrough which lie near the edges of the modulator passband.

The transmitter illustrated in FIG. 2 includes an antenna 210 driven by a radio-frequency power amplifier 212. The remainder of the arrangement illustrated in FIG. 2 is an exciter which produces a low-level carrier modulated with video information applied at an input terminal 214. Unlike the arrangement of FIG. 1, the arrangement of FIG. 2 modulates video directly to the final carrier frequency without an intermediate frequency.

Video information signals supplied at input jack 214 of FIG. 2 are applied to the cascade of a clamp circuit 216, a differential phase correction 218 and a differential gain corrector 220. The predistorted video signal is applied to a modulator 236 through a video amplifier and associated signal sampler illustrated as a block 224. The sampled video is applied to a resistor-diode video shaping network 230 to provide the correct control signal for a phase modulator 228. A signal source 238 produces a carrier signal at the final visual carrier frequency and applies the signal to modulator 236 through the control signal path of phase modulator 228. Modulator 236 modulates the video signal onto the carrier to produce a modulated carrier at the desired output frequency. The modulated carrier is applied to the input of power amplifier 212 by way of an amplifier 234 and a motorized power adjustment attenuator 240.

As in the case of the arrangement of FIG. 1, changes in the output of the exciter by means of attenuator 240 change the signal level in power amplifier 212. Since the incidental phase distortion of the signal in amplifier 212 depends upon the signal amplitude, changes of power result in a degradation of the distortion compensation.

It should be noted that attenuator 240 must be coupled in the signal path extending from the output of modulator 236 to the antenna in order to provide an output power adjustment. Coupling of attenuator 240 in the video signal path between terminal 214 and the input of modulator 236 will result in control over modulation depth rather than output power, and coupling attenuator 240 in the carrier signal path between source 238 and modulator 236 will have no significant effect so long as the carrier level applied to the modulator is maintained substantially greater than the video input level.

FIG. 3 illustrates a broadcast transmitter in accordance with the invention. In FIG. 3, an antenna 310 is driven by a power amplifier 312 with modulated signals at the visual carrier frequency. An exciter comprising the remainder of FIG. 3 produces a low-level modulated carrier for application to the input of amplifier 312.

Video signals applied to an input jack 314 are coupled to a video input clamp and to a differential phase corrector illustrated as a block 316, corresponding to those of FIG. 1. The clamped video signals are applied to an intermediate-frequency modulator or mixer 318. Modulator 318 is supplied with carrier signals from an IF carrier generator 319. Modulator 318 amplitude-modulates the video onto the carrier to produce a modulated carrier at the intermediate frequency. The modulated IF carrier is applied from modulator 318 to a vestigial sideband filter for eliminating a portion of the upper AM sideband. The filtered and modulated IF carrier is applied to the input of a modulator 336 by means of a cascaded motorized attenuator 340, signal sampler 324 and a differential gain corrector 332. A sample of the filtered modulated IF signal is coupled from sampler 324 to a video detector 326 which reconstitutes the video signal as modified by sideband filter 320. The reconstituted video is applied to a resistor-diode video shaping network illustrated as a block 330 to produce an appropriate control signal for a phase modulator 328.

In order to upconvert or mix the IF signal to the desired visual carrier frequency, modulator 336 must be supplied with an appropriate carrier signal. The carrier signal is generated by a signal source designated generally as 338 which includes a video carrier frequency generator illustrated as a block 342 and a mixer illustrated as 344. Mixer 344 receives inputs at the IF carrier frequency and at the desired video carrier frequency, and mixes the signals together to produce a signal at a frequency equal to the sum of the input frequencies. The sum output signal produced by mixer 344 is applied to the carrier input of modulator 336 by way of the phase-controlled signal path of phase modulator 328. The sideband filtered video-modulated IF signal from corrector 332 is mixed with the sum carrier signal in modulator 336 to produce a video-modulated vestigial sideband signal at the desired visual carrier frequency. The low-level signal produced by modulator 336 is amplified by power amplifier 312 and broadcast by antenna 310.

The inventive arrangement provides improved range of incidental phase correction, because phase modulator 328 controls a relatively high frequency signal, i.e., the phase control provided by a given change in delay corresponds to a greater phase shift at high frequencies. As a concommitant of the higher frequency of operation, a generally smaller physical phase modulator device results. Also, amplitude modulation contributions by phase modulator 328 in response to the control video signal are eliminated, since modulator 336 is generally not responsive to amplitude changes in the saturating carrier signal applied thereto. Thus, even though phase modulator 328 may have unavoidable amplitude response to the control video signal, this will not affect the transmitted output. Furthermore, phase modulator 328 may have a more limited proportional bandwidth (ratio of carrier to video bandwidth applied at the control terminal) than in the arrangement of FIG. 1.

In FIG. 3, motorized power control attenuator 340 adjusts the level of the intermediate frequency modulated carrier applied to modulator 336 and to sampler 324. Changes in the level of the intermediate frequency signal applied to modulator 336 changes the output power at the visual carrier frequency, and also changes the magnitude of the reconstituted video produced by detector 326. Thus, the phase correction provided by phase modulator 328 changes in response to the output power and by appropriate adjustment of video shaping circuit 330 may be made to track the incidental phase introduced by power amplifier 312. Also, the amplitude distortion correction provided by differential gain corrector 332 varies in consonance with the output power.

Other embodiments of the invention will be apparent to those skilled in the art. For example, the described motorized attenuator may be realized as a PIN-diode attenuator actuated by suitable remote controls. Also, the controlled signal path of phase modulator 328 may alternatively be coupled between the output of signal sampler 324 and the input of modulator 336 as illustrated by dotted connections in FIG. 3 whereby operation of attenuator 340 provides simultaneous control of the amplitude and phase correction of the modulated carrier signal.

What is claimed is:

1. An improved arrangement for generating incidental-phase modulation corrected modulated carrier signals at a predetermined frequency, comprising:

a source of information signals;

first modulator means coupled to said source of information signals for modulating said information signals onto an intermediate-frequency carrier to form a modulated IF carrier;

signal amplitude dividing means including an input terminal, and also including first and second output terminals;

first coupling means for coupling said input terminal of said signal dividing means to said first modulation means for applying said modulated IF carrier to said signal dividing means input terminal for directing portions of said modulated IF carrier to said first and second output terminals of said signal dividing means amplitude detection means coupled to said first output terminal of said signal dividing means for producing a reconstituted information signal;

second modulation means including first and second input terminals and also including an output terminal;

a source of second carrier signals at a frequency related to said intermediate frequency and to said predetermined frequency;

second coupling means for coupling said first and second input terminals of said second modulation means to said source of second carrier signals and to said second output terminal of said signal division means, respectively, for translating said modulated IF carrier signals by said frequency of said second carrier signals thereby producing modulated carrier signals at said predetermined frequency at said output terminal of said second modulation means, said second coupling means further comprising controllable phase modulation means including a control input terminal coupled to said amplitude detection means and also including a controlled signal path for correcting incidental phase modulation in response to said reconstituted signal;

wherein the improvement lies in that said controlled signal path of said phase modulation means is coupled between said source of second carrier signals and said first input terminal of said second modulation means for phase-correcting said second carrier signal and thereby correcting said modulated carrier signals at said predetermined frequency for incidental phase distortion.

2. An arrangement according to claim 1 further comprising a vestigial sideband filter coupled to said first modulator means for substantially eliminating one amplitude-modulation sideband from said modulated IF carrier.

3. An arrangement according to claim 1 further comprising remotely controllable attenuation means coupled to said first modulation means for simultaneously controlling the amplitude of said modulated carrier signals at said predetermined frequency and the magnitude of said incidental phase distortion corrector in a tracking manner.

4. An arrangement in accordance with claims 1, 2 or 3 further comprising differential gain control means coupled to said second modulation means for linearity correction in proportion to the amplitude of said modulated carrier signals at said predetermined frequency.

5. An improved arrangement for generating incidental-phase modulation corrected modulated carrier signals at a predetermined frequency, comprising:
a source of information signals;
first modulator means coupled to said source of information signals for modulating said information signals onto an intermediate-frequency carrier to form a modulated IF carrier;
signal amplitude dividing means including an input terminal, and also including first and second output terminals;
first coupling means for coupling said input terminal of said signal dividing means to said first modulation means for applying said modulated IF carrier to said signal dividing means input terminal for directing portions of said modulated IF carrier to said first and second output terminals of said signal dividing means;
amplitude detection means coupled to said first output terminal of said signal dividing means for producing a reconstituted information signal;
second modulation means including first and second input terminals and also including an output terminal;
a source of second carrier signals at a frequency related to said intermediate frequency and to said predetermined frequency;
second coupling means for coupling said first and second input terminals of said second modulation means to said source of second carrier signals and to said second output terminal of said signal division means, respectively, for translating said modulated IF carrier signals by said frequency of said second carrier signals thereby producing modulated carrier signals at said predetermined frequency at said output terminal of said second modulation means, said second coupling means further comprising controllable phase modulation means including a control input terminal coupled to said amplitude detection means and also including a controlled signal path for correcting incidental phase modulation in response to said reconstituted signal;
wherein the improvement lies in that said controlled signal path of said phase modulation means is coupled between said source of second carrier signals and said first input terminal of said second modulation means for phase-correcting said second carrier signal and thereby phase-correcting said modulated carrier signals at said predetermined frequency;
and in that for remote operation of the arrangement said first coupling means includes remotely controllable attenuation means for controlling the flow of modulated IF carrier to said signal splitter for control of the amplitude of said modulated carrier signals at said predetermined frequency, whereby changes in said amplitude of said modulated carrier signals at said predetermined frequency are accompanied by corresponding changes in said reconstituted signal and in said phase correction.

6. An improved arrangement for generating incidental-phase modulation corrected modulated carrier signals at a predetermined frequency, comprising:
a source of information signals;
first modulator means coupled to said source of information signals for modulating said information signals onto an intermediate-frequency carrier to form a modulated IF carrier;
signal amplitude dividing means including an input terminal, and also including first and second output terminals;
first coupling means for coupling said input terminal of said signal dividing means to said first modulation means for applying said modulated IF carrier to said signal dividing means input terminal for directing portions of said modulated IF carrier to said first and second output terminals of said signal dividing means;
amplitude detection means coupled to said first output terminal of said signal dividing means for producing a reconstituted information signal;
second modulation means including first and second input terminals and also including an output terminal;
a source of second carrier signals at a frequency related to said intermediate frequency and to said predetermined frequency, said source of second carrier signals being coupled to said first input terminal of said second modulation means;
controllable phase modulation means including a control input terminal coupled to said amplitude detection means and further including a controlled signal path responsive to said reconstituted signal, said controlled signal path being coupled to said second output terminal of said signal amplitude dividing means and to said second input terminal of said second modulation means for coupling modulated IF carrier signals to said second modulation means for producing at said output terminal of said second modulation means incidental phase corrected modulated carrier signals at said predetermined frequency;
wherein the improvement lies in that for remote operation of the arrangement said first coupling means comprises remotely controllable signal attenuation means for providing simultaneous control of the amplitude and phase correction of said modulated carrier signals at said predetermined frequency.

* * * * *